(No Model.)
F. EICHE.
LIFTER FOR STORE GOODS.
No. 584,337. Patented June 15, 1897.
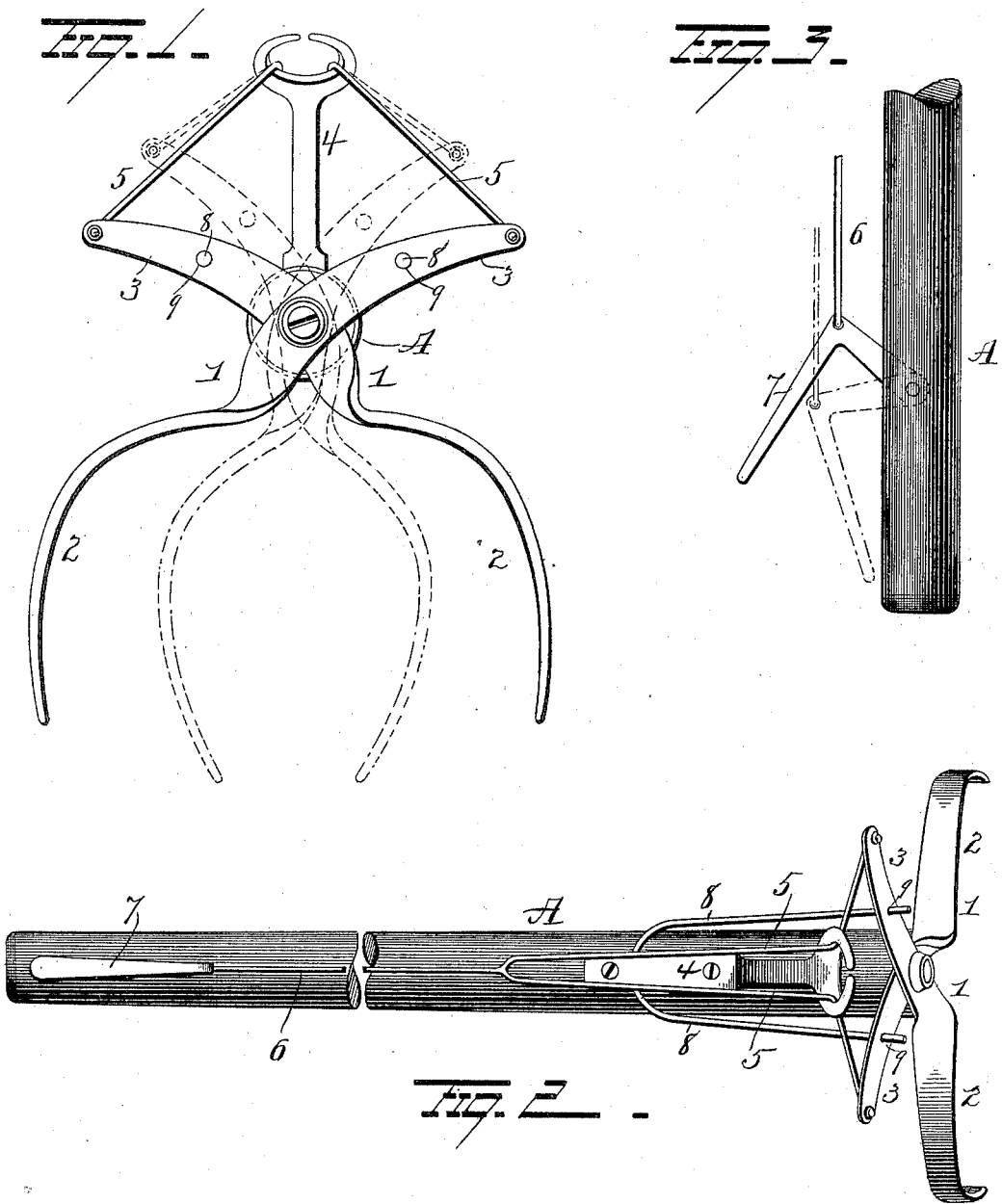
Witnesses
E. J. Nottingham
G. F. Downing
Inventor
F. Eiche
By F. A. Seymour
Attorney

UNITED STATES PATENT OFFICE.

FREDERICK EICHE, OF LINCOLN, NEBRASKA.

LIFTER FOR STORE GOODS.

SPECIFICATION forming part of Letters Patent No. 584,337, dated June 15, 1897.

Application filed April 14, 1896. Serial No. 587,570. (No model.)

*To all whom it may concern:*

Be it known that I, FREDERICK EICHE, a resident of Lincoln, in the county of Lancaster and State of Nebraska, have invented certain new and useful Improvements in Lifters for Store Goods; and I do hereby declare the following to be a full, clear, and exact description of the invention, such as will enable others skilled in the art to which it appertains to make and use the same.

My invention relates to an improvement in lifters for store goods, the object of the invention being to provide a simple and efficient device for removing boxes or packages from store-shelving.

A further object is to so construct the device that the box or package can be firmly grasped and lowered from a shelf without danger of being accidentally dropped and without necessitating undue exertion on the part of the operator.

With these objects in view the invention consists in certain novel features of construction and combinations and arrangements of parts, as hereinafter set forth, and pointed out in the claim.

In the accompanying drawings, Figure 1 is a plan view illustrating my improvements. Fig. 2 is an elevation of the device. Fig. 3 is a detail view.

A represents a pole or staff of any desired length and material. To the upper end of the pole or staff A two levers 1 1 are pivotally connected, the pivot-pin passing through said levers at points between their ends and entering the pole or staff in line with its axis, said levers being thus disposed horizontally. Each lever is made with a forwardly-projecting curved arm or jaw 2 and with a rearwardly and laterally projecting arm 3, the arms or jaws 2 being disposed to act in conjunction with each other to grasp a box or package and the arms 3 projecting laterally in opposite directions. Below the upper end of the pole or staff an arm 4 is secured thereto, and at its free end is made to project outwardly from said pole or staff, the free extremity of said arm being made in the form of an open loop to serve as guides for cords 5 5, the upper ends of which latter are secured to the free ends of the laterally-projecting arms 3. The lower ends of the cords 5 terminate in a downwardly-extending cord or wire 6, and the lower end of said cord or wire is attached to an L-shaped lever 7, pivoted to the pole or staff at or near the handle end thereof. A U-shaped spring 8 is secured between its ends to the pole or shaft and its free ends made to pass through holes 9 in the laterally-projecting arms 3, said holes being made between the ends of said arms. From this construction and arrangement of parts it will be seen that the U-shaped spring will act to maintain the arms or jaws 2 normally open, and that by operating the lever 7 said arms or jaws will be made to close, as shown by dotted lines in Fig. 1, and made to grasp a box or bundle to be lowered from a shelf. By attaching the cords 5 to the free ends of the arms 3 of levers 1 a large amount of leverage can be exerted to cause the arms or jaws 2 to grasp the box or package firmly without undue exertion on the part of the operator and liability of slipping will be reduced to a minimum.

My improvements are very simple in construction, comparatively cheap to manufacture, and effectual in all respects in the performance of their functions.

Having fully described my invention, what I claim as new, and desire to secure by Letters Patent, is—

The combination with a pole or staff, two levers crossing each other and pivoted at a common point between their ends at an end of the pole or staff whereby jaws are formed at one end and arms at the other, and said jaws bent substantially as shown, and a spring secured to the pole and having a loose connection with the jaws, of an arm 4 extending outwardly from the pole or staff, an operating hand-lever pivoted to the pole or staff and cords extending from the outer ends of the arms of the levers through the outer end of arm 4 and to the hand-lever, substantially as set forth.

In testimony whereof I have signed this specification in the presence of two subscribing witnesses.

FREDERICK EICHE.

Witnesses:
W. K. WILLIAMS,
AUGUST EICHE.